J. B. SUESS.
AUTOMOBILE HEADLIGHT LENS.
APPLICATION FILED DEC. 10, 1918.
1,302,239.   Patented Apr. 29, 1919.
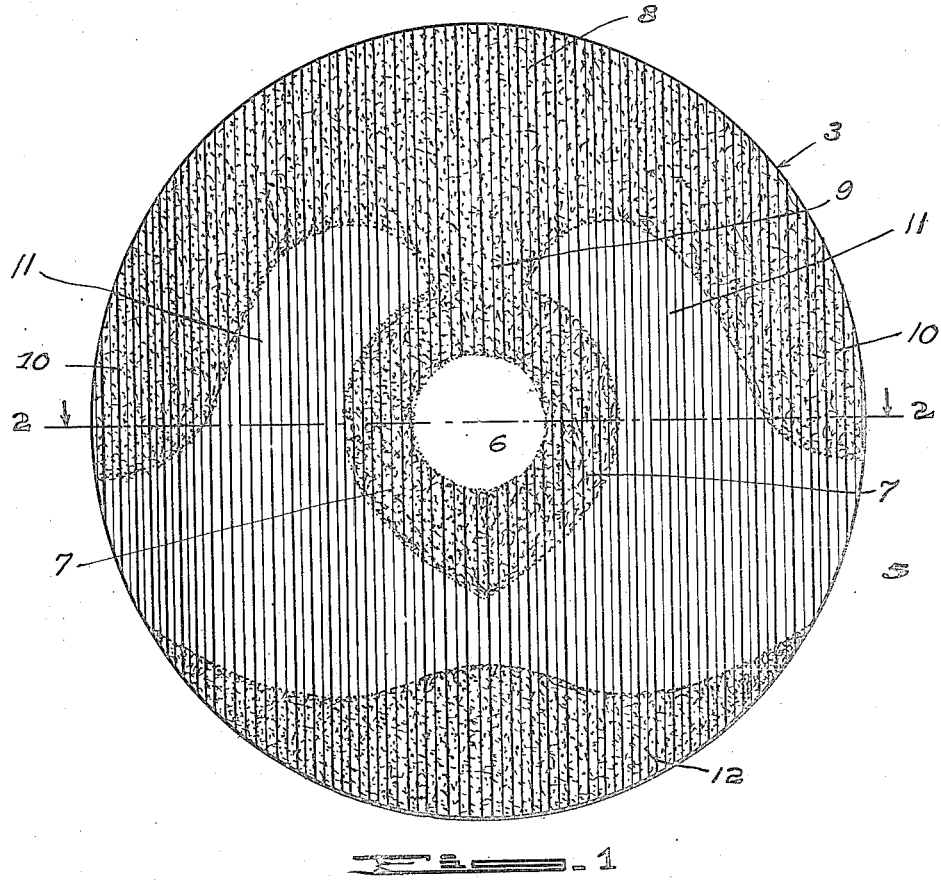
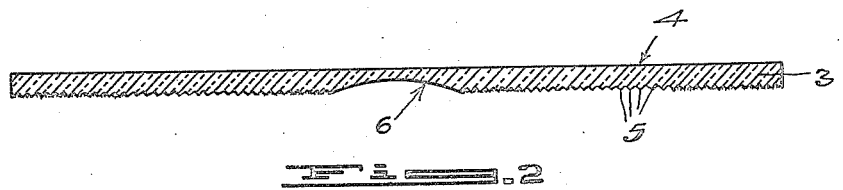
Inventor
JOHN B. SUESS
By his Attorney
Frank Warren

UNITED STATES PATENT OFFICE.

JOHN B. SUESS, OF SEATTLE, WASHINGTON.

AUTOMOBILE-HEADLIGHT LENS.

1,302,239.

Specification of Letters Patent.  Patented Apr. 29, 1919.

Application filed December 10, 1918. Serial No. 266,302.

*To all whom it may concern:*

Be it known that I, JOHN B. SUESS, citizen of the United States, residing at Seattle, in the county of King and State of Washington, have invented a certain new and useful Improvement in Automobile-Headlight Lenses, of which the following is a specification.

My invention relates to improvements in automobile headlight lenses and is an improvement in the lens disclosed and described in my prior Patent Number 1,269,978 issued June 18, 1918; and the object of my invention is to provide a lens which shall be adapted to constitute the front wall of a lamp casing and which shall be of such design that it will eliminate the glare from bright lamps and will diffuse and soften the rays of light and at the same time distribute such rays of light in a manner that will best serve to illuminate the roadway without blinding persons in front of the lamp.

A further object is to provide a headlight lens in the center of which is formed a relatively small concave divergent lens of clear glass that serves to transmit direct rays of light from a lamp positioned adjacent the rear thereof and distribute such rays over the roadbed in front of the lamp, the greater part of the reflected rays of light that issue from the lamp passing through the outer portions of the headlight lens that surround the small divergent lens which outer portions are of such form and structure that they serve to soften and diffuse such reflected rays of light.

I accomplish these objects by devices illustrated in the accompanying drawings, wherein—

Figure 1 is a view in elevation of a lens constructed in accordance with my invention; and Fig. 2 is a view in cross-section of the same on broken line 2, 2 of Fig. 1.

Referring to the drawings throughout which like reference numerals indicate like parts, the numeral 3 designates a lens comprising a circular glass plate whose front surface is smooth and flat and whose rear surface throughout the greater part of its area is provided with integral triangular prisms 5 which are disposed vertically each parallel with each other, the bases of adjacent prisms being contiguous.

The prisms 5 thus disposed form corrugations covering substantially the entire surface of one side of the headlight lens and serve to deflect and diffuse rays of light projected therethrough from a lamp disposed at a distance from the rear surface of the lens and to cause such rays of light to be evenly distributed over the surface and to the sides of the area in front of the lamp.

When my lens is disposed in an automobile lamp casing having a parabolic reflector the smooth surface of the headlight lens is turned outwardly while the corrugated surface is turned inwardly and the lamp or electric bulb which serves as a source of light is preferably placed in the focus of the parabolic reflector, the axis of the parabolic reflector being disposed to pass through the lamp bulb and through the center of the headlight lens.

Formed in the center of the headlight lens and preferably integral therewith is a relatively small plano-concave diverging lens 6 which is formed by buffing or rounding out the rear or corrugated surface of the lens as more clearly shown in Fig. 2.

In practice it has been found practical to make the diameter of the plano-concave diverging lens equal to substantially one-sixth the diameter of the entire headlight lens.

For the purpose of softening and diffusing the rays of light and dimming the glare the surface of the prisms 5 are matted as indicated at 7 as by sand blasting or grinding the central area of the headlight lens and surrounding the diverging lens 6. The transverse over-all dimension of the frosted central portion 7 in a horizontal line being substantially one third of the distance across the lens.

In order to soften and diffuse the diverging rays of light that are reflected from the reflector through the upper portion of the lens and thus dim the glare of said reflected rays of light, the surface of the prisms 5 throughout the area of the upper portion are frosted or matted as indicated at 8, the shape of the area of the upper portion 8 being such that its center portion 9 extends downwardly to merge with the upper edge of the central portion 7 while the outer portions 10 extend downwardly and around the outer edges of the lens to points slightly below the center line thereof, thereby leaving unfrosted portions 11 between the frosted central portion 7 and the outer frosted portions 10.

To further eliminate the glare from the lamp and the reflector the lower portion of the lens is matted or frosted as at 12 in substantially the shape shown in Fig. 1.

When in use the matted portions of the lens, and the prisms 5 serve to eliminate the glare common to automobile headlights and diffuse and distribute the rays of light so that a soft mellow light is directed outwardly and downwardly in front of the lamp. At the same time the light rays issuing directly from the source of light pass outwardly through the divergent lens 6 and are directed forwardly to illuminate the roadbed directly in front of the lamp. The diverging lens 6 serves mainly to transmit the direct rays of light from the lamp bulb while the reflected rays from the reflector which are the rays that produce the greater part of the blinding effect of glare visible to persons in front of the lamp are caused to pass through the matted and corrugated portions of the lens and are softened and diffused thereby.

What I claim is:

A headlight lens comprising a glass plate having a small transparent integrally formed diverging lens in its center, a matted section of substantially one-third the diameter of the headlight lens surrounding said central diverging lens, a matted section extending across the bottom of said headlight lens, and a matted section at the upper portion of said headlight lens and extending around the outer portion of said headlight lens to substantially the horizontal axis thereof, the medial portion of said upper matted section extending downwardly and merging with said central matted section.

In witness whereof, I hereunto subscribe my name this 4th day of December A. D. 1918.

JOHN B. SUESS.